T. E. BUSCHMANN.
BALL AND ROLLER CLUTCH.
APPLICATION FILED OCT. 14, 1910.
993,025.
Patented May 23, 1911.
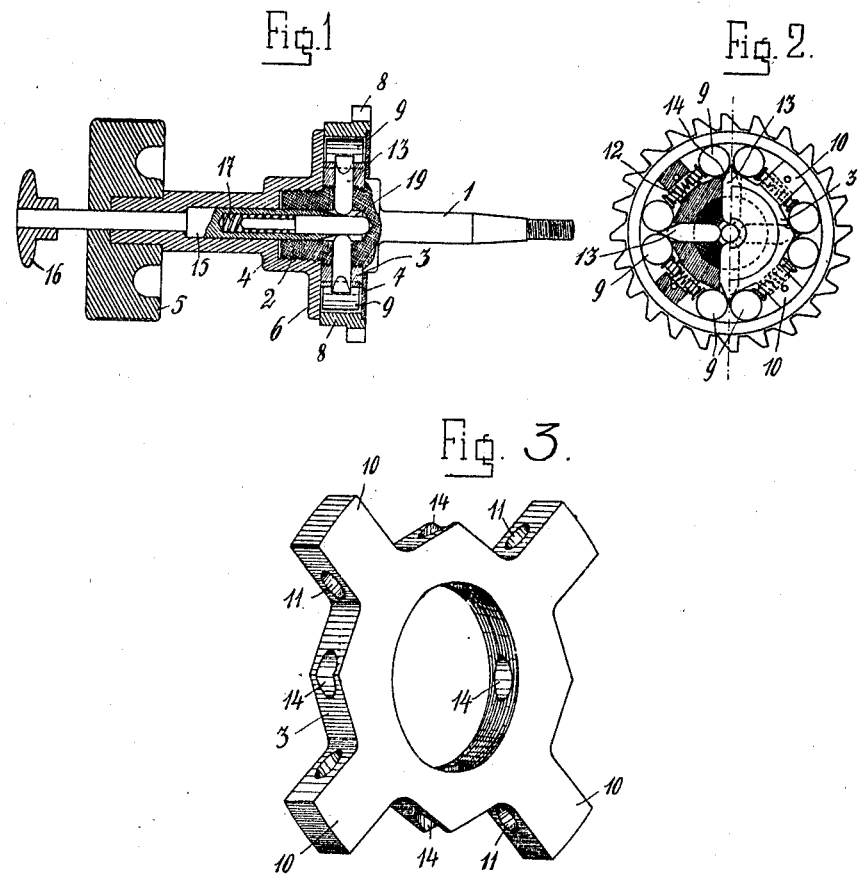
WITNESSES
INVENTOR
Theodor Eugen Buschmann

UNITED STATES PATENT OFFICE.

THEODOR EUGEN BUSCHMANN, OF CHEMNITZ, GERMANY, ASSIGNOR TO THE FIRM OF WANDERER-WERKE VORM. WINKLHOFER & JAENICKE, A. G., OF SCHONAU, NEAR CHEMNITZ, GERMANY.

BALL AND ROLLER CLUTCH.

993,025.  Specification of Letters Patent.  Patented May 23, 1911.

Application filed October 14, 1910.  Serial No. 587,001.

*To all whom it may concern:*

Be it known that I, THEODOR EUGEN BUSCHMANN, a subject of the German Emperor, and residing at Chemnitz, Germany, have invented certain new and useful Improvements in Ball and Roller Clutches, of which the following is a specification.

My invention relates generally to clutches operating by the jamming action of balls or rollers, and particularly to clutches of this type for securing and breaking rotative continuity of the platen roll with the line-spacing mechanism in typewriters.

For the purpose of enabling the platen roll in a typewriter to be rotated independently of its feeding mechanism, it has already been proposed to form the connection between the platen roll and the line-spacing mechanism by means of a clutch which will allow this connection to be broken at all times. It has further been proposed to effect this coupling and uncoupling by means of a roller clutch capable of acting in both directions of its rotation, in which the clutch rollers are arranged to be pushed by means of small sliding pieces back out of their operative *i. e.* coupling position for the purpose of opening the clutch, *i. e.* disconnecting the platen roll from the line-spacing mechanism.

Now the present invention has for its object to provide an improved clutch of this type, and consists substantially in so forming the part, hereinafter called the "bearing part," in which the clutch balls or rollers are mounted and operate, that it not only constitutes or contains the bearings or races for these balls or rollers, but also contains the springs for forcing these balls or rollers into their operative position, as well as the sliding pieces for moving the said balls or rollers out of their operative position. To this end, the bearings or races for the clutch balls or rollers are milled out of the said bearing part in such a manner as to leave a radial projection between adjacent bearings or races, and a tangential hole is formed in each such radial projection for the reception of a spring arranged to press at its ends against the adjacent balls or rollers with a tendency to push them into their operative position. Radial slots or bores are also provided in the said bearing part for the reception of the sliding pieces which act to render the balls or rollers inoperative and thus open the clutch.

It is to be understood that this invention is applicable to clutches in general, and is not limited to clutches used in typewriters.

One illustrative embodiment of my invention is represented by way of example in the accompanying drawings, wherein:—

Figure 1 is a longitudinal section of the improved clutch designed for use in a typewriter, Fig. 2 a cross-section taken on the line *a—b* in Fig. 1, and Fig. 3 is a perspective view showing a detail on an enlarged scale.

The platen roll, not shown, of the typewriter is connected in known manner to the platen axle 1 which is provided at one end with a screw-threaded boss 2 of larger diameter. On this boss is mounted not only the bearing part 3 that carries the clutch rollers, but also the flanged guide sleeve 4 on which the hand wheel 5 is fixed. A disk 7 of the same diameter as the flange 6 of the sleeve is mounted on the boss 2. Between the flange 6 and disk 7 are the clutch and also the ratchet wheel 8 of the line-spacing mechanism which is not further illustrated.

Now my invention consists substantially in the peculiar construction of the bearing part 3 which carries the clutch rollers 9.

Four pairs of clutch rollers are shown as being provided in the example, so that there are two sets of clutch rollers, of which each set effects a coupling in one direction of rotation. The number of clutch rollers depends on the size of the clutch. For typewriters, and more particularly for the purpose of coupling the platen roll with the line-spacing wheel, the four pairs of clutch rollers shown in the present example will suffice.

As shown in Figs. 2 and 3, the bearing part 3 is constructed to receive the clutch rollers in its periphery; that is, it is provided by milling with peripheral recesses that serve as cages or races for rollers or balls so as to leave portions 10 of the periphery projecting between adjacent pairs of rollers. These portions or lugs 10 are each formed with a tangential perforation 11 in which a spiral spring 12 is inserted, as shown in Fig. 2, for the purpose of exerting pressure at both of its ends against the adjacent clutch rollers with a tendency to force the latter into the coupling position.

The clutch is opened by means of small sliding pieces or wedges 13 which are slidably mounted in radial guides in the bearing part 3. In the example shown, the bearing part 3 is formed with holes 14 in which the sliding pieces or wedges 13 are guided. If it is desired that the bearing part 3 shall be as flat, that is, as thin as possible, it will be advisable to leave these guide holes open on one side.

To open the clutch, the sliding pieces or wedges 13 must be forced radially outward. For this purpose the wedges 13 are made capable of moving back i. e. radially inward in guides formed in the screw-threaded boss 2 on the axle 1. The boss 2 is provided with a rather deep axial bore 19 adapted to receive a hollow pin 15 having a rounded conical end. This hollow pin 15 extends through the guide sleeve 4 and the hand wheel 5 and carries on its outer end a handle or push knob 16. In the interior of the pin 15 is a spring 17 bearing at its inner end against a pin 18 which bears against the bottom of the bore 19 in the boss 2. By pressing the pin 15 by means of its knob 16 into the boss 2 in opposition to the action of the spring 17, the rounded conical end of the pin 15 will force the wedges 13 radially outward, whereby the thin ends of the wedges will force the clutch rollers 9 apart and thus open the clutch. When the pin 15 is released, the balls or clutch rollers 9 will be returned by their springs 12 back into the coupling position, the wedges 13 being forced back by them. Any other means however may be employed for the purpose of returning the wedges into their inoperative position on the release of the pin 15.

The bearing part constructed as shown for the clutch rollers may be applied to any other kind of clutch, so that the use of the present invention is not limited to typewriters.

I claim:—

1. In a clutch of the character described, a bearing disk having peripheral recesses and outwardly extending lugs positioned between said recesses, a clutch member surrounding said disk each of said recesses increasing in depth from its central portion toward said lugs, a pair of rollers carried in each of said recesses, a radial guide operatively associated with each of said recesses and positioned adjacent their central portions, means for normally forcing the rollers away from said lugs into the shallow portions of said recesses and into engagement with said clutch member, and means movably mounted within said guides adapted upon being operated to force said rollers toward said lugs into the deeper portions of said recesses and out of engagement with said clutch member.

2. In a clutch of the character described, a bearing disk having peripheral recesses and outwardly extending lugs positioned between said recesses, a clutch member surrounding said disk, each of said recesses increasing in depth from its central portion toward said lugs, a pair of rollers carried in each of said recesses, a radial guide operatively associated with each of said recesses and positioned adjacent their central portions, said lugs being provided with perforations connecting adjacent recesses, springs within said perforations and engaging the rollers on either side of the lugs to force the rollers away from said lugs into the shallow portions of said recesses and into engagement with said clutch member, and means movably positioned within said guides for coacting with said pairs of rollers to force them toward said lugs into the deeper portions of said recesses and out of engagement with said clutch member.

In testimony whereof, I affix my signature in the presence of two witnesses.

THEODOR EUGEN BUSCHMANN. [L. S.]

Witnesses:
ANNA URLASZ,
F. W. OSTMANN.